Aug. 27, 1957

E. BUSCH 2,803,989

CONTINUOUS PROJECTION UNIT

Filed May 14, 1953

INVENTOR.
Edwin Busch.
BY
Learman & Learman
ATTORNEYS

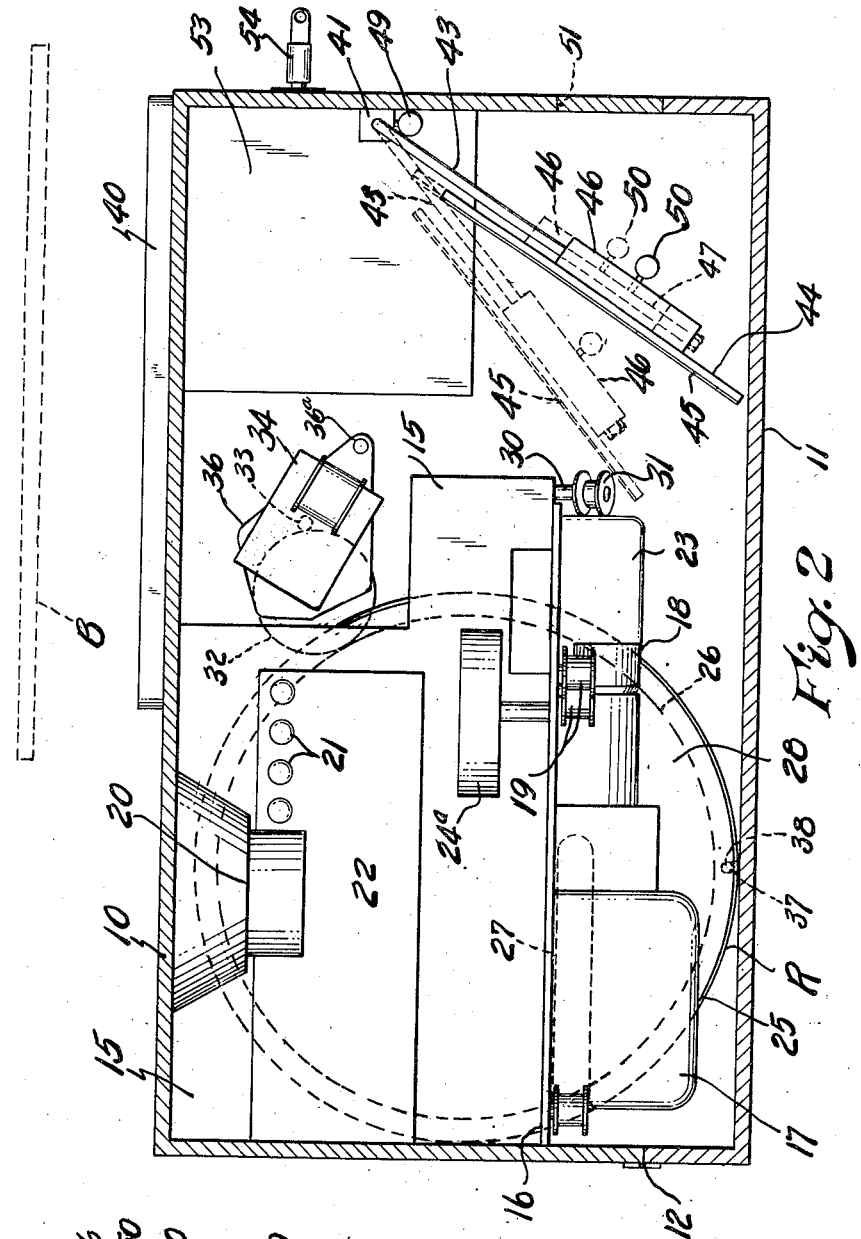

United States Patent Office 2,803,989
Patented Aug. 27, 1957

2,803,989
CONTINUOUS PROJECTION UNIT

Edwin Busch, Saginaw, Mich.

Application May 14, 1953, Serial No. 354,972

8 Claims. (Cl. 88—18.7)

This invention relates to continuous projection units, and more particularly to units of this type wherein reflector means are employed to transfer the picture to built-in screens. Such units will be principally employed in sales demonstration and training work and by lecturers, educators, and the like, but will also find a multitude of other uses.

One of the prime objects of the invention is to design a practical, compact, continuous projection unit which is very easy to operate and which is economical to manufacture and assemble.

Another object of the invention is to provide a unit of the type described, which is extremely versatile in operation in that it can be used for direct projection as well as for reflected projection at various distances, with a minimum of adjustment, it being necessary only to adjust the position of a universally adjustable mirror within the unit case.

A further object of the invention is to design a projection unit of the type described, wherein a continuous reel or magazine can be simply slid into place under the projector in the unit, guide means being provided to insure that the reel will always be in properly aligned operating position.

Another object of the invention is to design a continuous projection unit in which the continuous reel is power driven so that the film feeding to the reel is not under tension and the film returning to the reel is positively taken up, thus eliminating wear and insuring longer film life, and advantageously supplementing conventional procedures wherein the film must be drawn from the reel by the projector.

A further object of the invention is to design a continuous projector unit in which film magazines can be readily replaced to obtain a change of film subject and which can be readily converted to non-continuous projection when desired.

A still further object of the invention is to design a continuous projection unit which is pleasing and attractive in appearance, and includes universally adjustable reflector means which permits sharply defined, steady pictures to be obtained at various projecting distances even under brightly lighted conditions.

With the above and other objects in view, the present invention consists in the combination and arrangement of parts, hereinafter more fully described, illustrated in the accompanying drawings, and more particularly pointed out in the appended claims, it being understood that changes may be made in the form, size, proportions, and minor details of construction, without departing from the spirit, or sacrificing any of the advantages of the invention.

In the drawings:

Fig. 2 is a sectional, top plan view thereof, the broken lines on the right indicating another adjusted position of the mirror and those on the left defining the position of the reel or magazine. Broken lines in this view indicate also a rear projection screen which could be used upon removal of the built-in screen.

Fig. 3 is an edge elevational view of the mirror assembly only, showing the mirror swung into approximately longitudinal alignment with the mounting block on the end wall of the case which would permit direct projection through an opening in the end wall of the case, the broken lines indicating tilted positions of the mirror.

Figure 1:
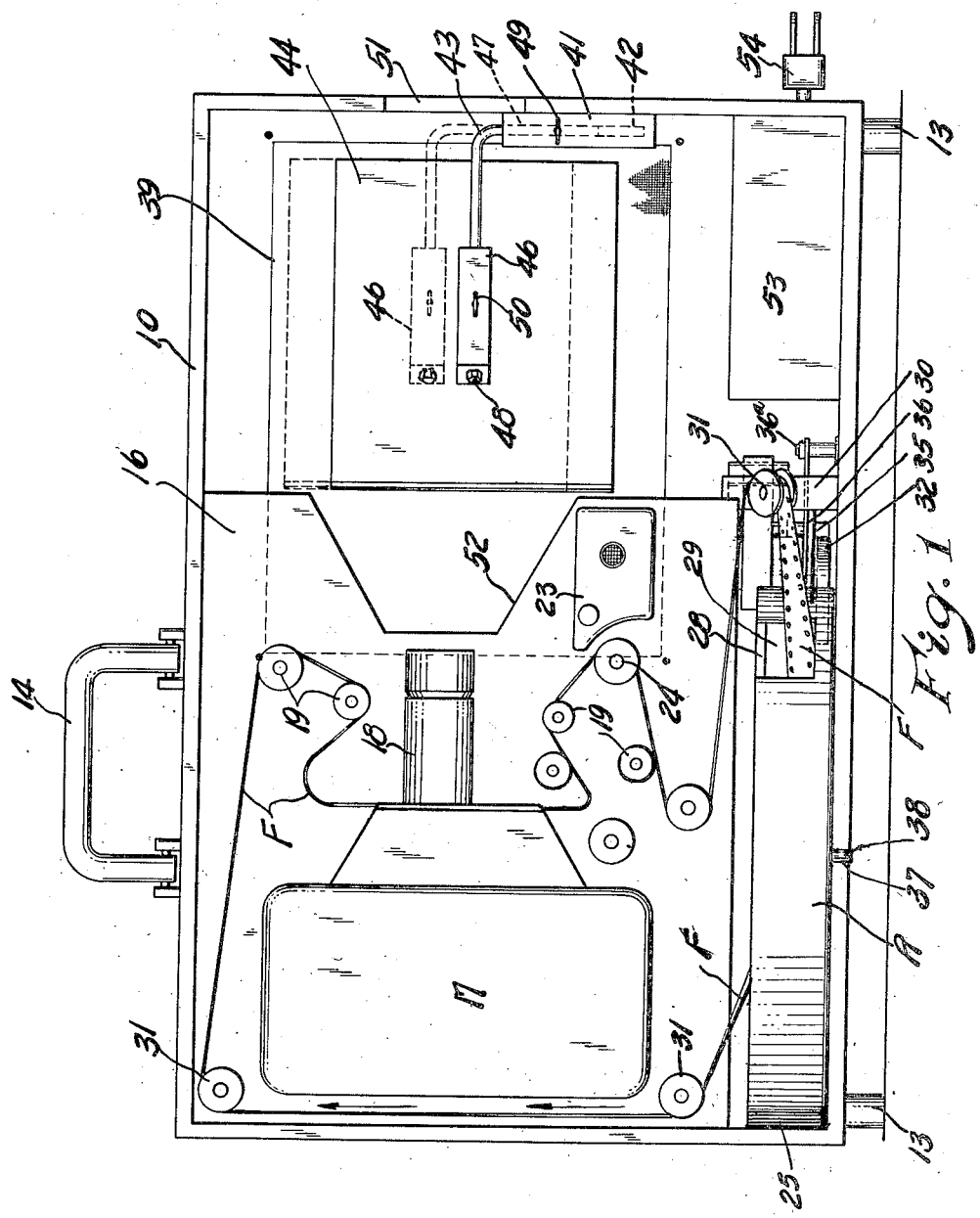
Fig. 1 is a rear elevational view of my projection unit with the rear door thereof removed, the broken lines on the right indicating an adjusted position of the mirror.

Referring now more particularly to the accompanying drawings wherein I have shown the preferred embodiment of my invention, a numeral 10 generally indicates the prismatic cabinet or case of my continuous projector unit, which includes a door 11 hingedly connected thereto as at 12. Legs 13 are provided for the case, and a handle 14 is mounted on the top thereof to facilitate the carrying thereof, and it will be apparent that the unit is readily portable.

A horizontally disposed support plate 15 is provided a spaced distance above the bottom of the case as shown, and a vertical partitioning member 16 is mounted within the case, the member 16 supporting a conventional projector which includes a casing 17, a lens holder 18, and film guide and idler rollers 19. The projector is provided with sound apparatus which briefly includes a speaker 20, speaker tubes 21, an amplifier 22 supported on the plate 15, an exciter lamp cover assembly 23, a sound drum 24, and a sound drum fly wheel 24a. The elements of the projector and the sound apparatus have been summarily treated, since they are conventional units which are available on the market.

Mounted under the projector unit and plate 15 is a continuous film magazine or reel R which includes an outer casing 25 within which is rotatably mounted a film carrier disk 26. A continuous magazine of this type wherein the continuous film is simultaneously withdrawn from the center of the coiled film and rewound on its outer periphery after passing through the projector, forms the subject matter of my co-pending application Serial No. 356,546, filed May 21, 1953. A slotted opening 27 is provided in the cover 28 of the outer casing for the passage of the film F to the projector and an opening 29 is likewise provided in the side wall of the casing 25 for the return of the film F.

A block 30 is provided with a film guide roller 31 as shown to guide the film from the projector back to the reel, and similar rollers 31 are mounted on the partition 16 to guide the film to the projector. The carrier disc 26 is driven from a point adjacent its periphery by a flexible disc 32 which is powered by the drive shaft 33 of a constant speed motor 34 synchronized to operate at the same speed as the projector. A slidably supported plate 35 has a depending shaft (not shown) which pivotally supports the disc 32, and the plate 35 and disc 32 are movable laterally outwardly against the action of a spring (not shown) which normally holds the disc 32 in engagement with the carrier disc 26. A slot (not shown) is provided on the peripheral wall of the outer casing 25 and the disc 32 projects thereinto to engage and drive the carrier 26 as shown in broken lines in Fig. 2, the plate 36 of the motor 34 being supported on posts 36a.

It is to be observed that a transversely angled slot 37 is provided in the bottom of the case at a point spaced from the left wall of the case as viewed from Fig. 1, and that a depending lug or pin 38 on the bottom of the reel R is adapted to be accommodated therein. The positions of the slot 37 and lug 38 are carefully predetermined with relation to the side wall of the case, the diameter of the reel, the position of the disc 32, and the disposition of the openings 27 and 29 so that the reel can be simply pushed into properly aligned position. The advantages of providing such a guide pin and aligned slot in conjunction with a drive of the type described which permits the reel to be simply pushed in under the projector and eliminates the necessity of aligning the reel, are obviously many. When the magazine R is in position, the outermost point on its periphery is flush with the rear door 11 when it is swung to closed position and is held in place thereby.

A transparent rear projection screen 39 with a bezel 40 as shown, is removably mounted in the front wall of the case as shown. Secured to the end wall of the case there adjacent is a vertically disposed block 41 formed with a bored opening 42 therein in which is accommodated one end of a right angular bent rod 43. A rectangularly shaped mirror 44 with a backing plate 45 is provided with a similar block 46 which is horizontally disposed and has a bored opening 47 through which the opposite end of the rod 43 extends. Note that the free end of the rod 43 is threaded and that a nut 48 is provided thereon as a stop. Setscrews 49 and 50 on the blocks 41 and 46 respectively, permit the locking of the mirror in various adjusted positions.

It will be apparent that this unique manner of mounting the mirror permits its universal adjustment. For example, the mirror can be adjusted vertically relative to the block 41 or swung thereabout. It can be adjusted longitudinally on the horizontal portion of the rod 43, or tilted at any desired angle. These features permit the use of the projection unit in a manner heretofore not contemplated. The mirror is normally located a sufficient distance from the lens of the projector so that a picture of considerable size can be projected on the screen 39. Obviously, the size of the picture projected can be varied by adjusting the mirror on the horizontal portion of the rod 43, and when the screen 39 is removed, the picture can be projected through the screen opening onto the rear of the larger rear projection screen B (Fig. 2). Thus, the unit can be used with any size or type rear projection display or exhibit. The mirror can further be readily adjusted to properly center the picture and tilted to obtain a clear, non-distorted picture. In some cases, it may be desirable to project directly upon a conventional screen through an opening 51 in the wall of the casing, and clearly, this would not be possible unless the mirror could be swung out of the way. The partition 16 is cut away as at 52 and the mirror is simply turned horizontally and swung forwardly toward the screen 39. Alternatively, the mirror could be moved toward the block 41 until it could clear the partition 16.

A cord box 53 is provided as shown to house the cord which must be drawn out of an opening (not shown) in the side of the case and connected to a source of power, and a plug 54 is shown on the end of the cord.

In normal operation, the film travels the path indicated by the dotted lines and the projector, of course, projects the picture upon the mirror which reflects it to the screen 39. The projection is continuous and the film on the reel will show over and over again until the unit is stopped. To change the film subject, it is only necessary to slip out one magazine and slide in another. Since the film carrier 26 is driven by the motor, there is no tension on the film which floats freely to the projector mechanism. Additionally, there is a positive take-up of the returning film which is, of course, a very desirable feature not found in units where the projector must draw the film from the reel.

From the foregoing description, it will be obvious that I have perfected a very simple, practical and relatively inexpensive continuous projector unit, and while in the present instance I have shown and described a preferred embodiment of my invention, I contemplate as within the scope of my invention all such forms as may be covered by the appended claims.

What I claim is:

1. In a continuous reproducing unit; a housing; a reproducing unit in said housing; a removably supported magazine supported in said housing; a coiled strip carrying member in said magazine revolvably supported therein; said magazine being open to expose at least a portion of the peripheral edge of the said member and to permit said strip to be fed from said member to and from said reproducing unit; a drive wheel mounted in said housing in substantially coplanar relation relative to said strip carrying member; cooperable guide means on said magazine and housing predetermining the direction of movement of said reel into said housing with said strip carrying member in prepositioned disposition so that its exposed edge comes into engagement with said drive wheel; and means for holding said magazine in position so that said exposed edge remains in driving engagement with said drive wheel.

2. In a continuous reproducing unit; a housing; a reproducing unit in said housing; a removably supported magazine supported in said housing; coiled strip carrying and moving means on said magazine revolvably supported by said magazine; said means including a first portion carrying said coiled strip and a second portion which can be driven to revolve said strip; said magazine being open to permit said strip to be fed from said means to and from said reproducing unit; a drive element mounted in said housing; cooperable guide means on said magazine, independent of said portion of said means which can be driven, and on said housing predetermining the direction of movement of said magazine into said housing with said magazine in prepositioned angular disposition so that a particular portion of its periphery including the portion of said means which is driven is presented to said drive element; and means for holding said magazine in position so that said portion which is driven remains in driving engagement with said drive element.

3. The combination defined in claim 2 in which said housing has an opening, providing access to the interior of the housing, out which the magazine can be removed; and said means for holding said magazine in position includes a door in one position covering said opening and means releasably securing said door in closed position.

4. The combination defined in claim 2 in which said guide means on the magazine comprises a pin depending from the magazine; and the cooperating guide means on the housing comprises a wall having a guide channel leading generally toward said drive element.

5. The combination defined in claim 2 in which said housing includes side walls and has an opening providing access to the interior of the housing out which the magazine can be removed; a door in one position covering said opening; the magazine when the second portion of the coiled strip carrying and moving means is in engagement with said drive element engaging one of the side walls; the means for holding said magazine in position, with said second portion against said drive element and the magazine against the said side wall, comprising said door and means for holding said door in closed position.

6. The combination defined in claim 2 in which said housing includes side walls and a wall on which said magazine is supported; said housing having also an open side, a door in one position covering said open side; the magazine, when the second portion of the coiled strip carrying and moving means is in engagement with said drive element, engaging one of the side walls; said guide means comprises an off center lug depending from said magazine and a guide channel receiving said lug in said wall supporting the magazine; said channel extending generally in toward said drive element; said means for holding said magazine in position, with the said second portion of the strip carrying and moving means in engagement with the drive element and the magazine against the side wall, comprising said door and means securing said door in closed position; the lug in the slot cooperating with said side wall and engagement of the said second portion of the strip carrying and moving means with the drive element to prevent angular displacement of the magazine when the magazine is in position.

7. The combination defined in claim 2 in which said housing has side walls; one of said walls carrying a translucent screen; said reproducing unit comprises a projector with its lens projecting in a plane generally parallel with the plane of the screen; and a mirror mounted on another side wall of said housing opposite said lens and tilted to transfer the picture projected thereon to said screen.

8. The combination defined in claim 7 in which a socket is provided on the wall of the housing on which the mirror is mounted; an angularly bent rod is provided having one end pivotal in said socket and the other extending generally in the plane of said lens; and said mirror is pivotally mounted on said extending end of the rod and is movable longitudinally on said rod.

References Cited in the file of this patent

UNITED STATES PATENTS

| | | |
|---|---|---|
| 966,077 | Bonta | Aug. 2, 1910 |
| 1,428,347 | Altena | Sept. 5, 1922 |
| 2,008,110 | Scheibell | July 16, 1935 |
| 2,181,112 | Fries | Nov. 21, 1939 |
| 2,265,992 | Beck | Dec. 16, 1941 |
| 2,279,022 | Duskes | Apr. 7, 1942 |
| 2,290,287 | Links | July 21, 1942 |
| 2,320,247 | Roger | May 25, 1943 |
| 2,473,736 | Stern | June 21, 1949 |
| 2,568,734 | Heyer | Sept. 25, 1951 |
| 2,651,966 | Bradford | Sept. 15, 1953 |
| 2,740,628 | Small | Apr. 13, 1956 |